Patented Dec. 24, 1940

2,225,618

UNITED STATES PATENT OFFICE 2,225,618

AMINE SALTS OF NITRO-PHENOLS

Edgar C. Britton and Frank B. Smith, Midland, Mich., assignors to The Dow Chemical Company, Midland, Mich., a corporation of Michigan No Drawing. Application November 22, 1939,
Serial No. 305,706

13 Claims. (Cl. 260—563)

This invention relates to amine salts, and is particularly concerned with those cyclohexyamine salts of phenols characterized by nuclear-substituted nitro groups in the para- position and in one of the positions ortho- to the hydroxyl radical, and in which the cyclohexylammonium radical has the following formula $(C_6H_{11-m}R_m-)_nNH_{4-n}$—wherein $m$ and $n$ are integers not greater than 2, and R represents a hydrogen, halogen, aryl, aralkyl, cycloalkyl, or an alkyl radical containing from 1 to 8 carbon atoms, inclusive. We have prepared representative members of the above-identified group of compounds and found them to be high-melting crystalline solids, difficultly soluble in both water and common organic solvents. These compounds are stable to light and air, not appreciably affected by carbon dioxide, and are yellow to orange-red in color. They are valuable as insecticides and fungicides.

A group of compounds falling within the scope of the invention as defined above, which because of their unusually low solubility in water are particularly valuable for use in insecticidal spray compositions, are those amine salts derived from 2,4-dinitro-phenols having the formula

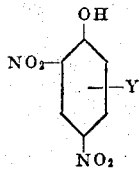

wherein Y represents a benzo, aryl, or cycloalkyl substituent, or a lower alkyl radical containing at least 2 carbon atoms. The preferred embodiment of the cyclohexyl-ammonium radical is encompassed by the following formula

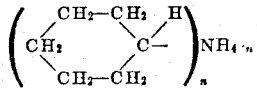

wherein $n$ represents 1 or 2.

The new compounds are prepared by reacting a suitable amine compound, such as cyclohexyl-amine, methyl-cyclohexyl-amine, or dicyclohexyl-amine, with a solution of a 2,4-dinitro-phenol in benzene, chlorbenzene, or alcohol. Substantially equimolecular proportions of the nitro-phenol and amine have been found to give the desired salts in good yield, although any suitable amounts may be employed. Where an excess of one or the other of the reactants is present in the final product, separation is readily accomplished by extraction with benzene or other solvent for the nitro-phenol and amine, in which the amine salt is difficultly soluble. The operating temperatures are not critical, although reduced amounts of solvent are required when the reaction is carried out at somewhat elevated temperatures, e. g. between about 40° and 120° C. The reaction can be conveniently carried out at any desired temperature up to the refluxing temperature of the reaction mixture. On addition of the amine to the dinitro-phenol solution, the insoluble amine salt of the phenol begins to precipitate out of the mixture. The formation and precipitation of such salt is generally complete within about one hour after completion of the amine addition. To insure the formation of a relatively homogeneous product and to minimize occlusion, the amine is preferably added portion-wise with stirring over an appreciable period of time. Following completion of the reaction, the mixture is filtered or otherwise manipulated to separate out the insoluble amine salt, which may be further purified by washing with small amounts of such solvents as benzene, chlorbenzene, and the like. The amine salt obtained as a residue from the separation is then dried at a temperature calculated to volatilize residual traces of solvent.

An alternate method consists of carrying out the reaction in water solution. In this modification of the procedure, the sodium salt of the selected phenol is reacted with the hydrochloride or other inorganic acid salt of the cyclohexylamine, it being sufficient to contact aqueous dispersions or solutions of the reactants one with the other. The cyclohexyl-amine salt so obtained is sufficiently insoluble in water that there is no problem of separation and isolation.

The following examples set forth certain embodiments of the invention, but are not to be construed as limiting the same:

Example 1

17 pounds of 2,4-dinitro-6-cyclohexyl phenol and 27 pounds of benzene were mixed together and warmed to approximately 78° C., at which temperature the phenol was entirely dissolved in the benzene. 11.6 pounds of dicyclohexyl-amine was then added portion-wise to the phenol solution over a period of approximately 15 minutes. The benzene-insoluble dicyclohexyl-amine salt of 2,4-dinitro-6-cyclohexyl phenol began to precipitate from the solution immediately after the addition of the first portion of the amine. Following completion of the amine addition, the reaction mixture was stirred for one hour, at the end of which time the thick slurry of product was filtered to separate the reaction product. The residue from the filtration was successively extracted with 35-pound and 30-pound portions of benzene to separate out traces of the free phenol and dicyclohexyl-amine. The extracted amine salt residue was then dried in the air at 80° C., whereby there was obtained 26 pounds 2 ounces of the dicyclohexyl-amine salt of 2,4-dinitro-6-cyclohexyl phenol as an orange crystalline product, melting at 197°-198° C. and having a solubility at 25° C. of 0.0028 gram per 100 grams of water. This compound was relatively stable on exposure to light and air and substantially insoluble in most common organic solvents and petroleum oil.

*Example 2*

26.6 grams of 2,4-dinitro-6-cyclohexyl phenol and 25 milliliters of benzene were mixed together and warmed until the dinitro-phenol was completely dissolved in the benzene. 11.3 grams of 2-methyl-cyclohexyl-amine was then added portion-wise with stirring to the phenol solution over a period of about 10 minutes. The reaction mixture refluxed vigorously during this addition due to heat of reaction. Fine orange-yellow crystals of the amine salt were precipitated during the addition. When all of the amine had been added, the mixture was warmed and agitated for an additional 30 minutes and thereafter cooled and filtered. The residue was washed with 40 milliliters of benzene, filtered, and dried at 70° C. in the air. The resulting product consisted of 34 grams of the 2-methyl-cyclohexyl-amine salt of 2,4-dinitro-6-cyclohexyl phenol in the form of fine orange crystals melting at 201° C. This compound was substantially insoluble in most common organic solvents and soluble to the extent of 0.0084 gram in 100 grams of water at 25° C. Upon exposure to the air and light for long periods of time, there was no change in either the chemical composition or appearance of this product.

In a similar manner, other cyclohexyl- and substituted cyclohexyl-amines were reacted with 2,4-dinitro-phenol compounds to obtain such amine salts as:

The di-(2-methyl-cyclohexyl)-amine salt of 2,4-dinitro-6-cyclohexyl phenol, a light orange crystalline compound, melting at 193°-194° C. and soluble to the extent of 0.0049 gram per 100 grams of water at 25° C.

The cyclohexyl-amine salt of 2,4-dinitro-6-cyclohexyl phenol as an orange-yellow crystalline material, melting at 218°-219° C. and soluble in water at 25° C. to the extent of 0.0222 gram per 100 grams of water.

The dicyclohexyl-amine salt of 2,4-dinitro-6-ethyl phenol as an orange crystalline product, melting at 179°-180° C. and having a solubility of 0.0458 gram per 100 grams of water at 25° C.

The dicyclohexyl-amine salt of 2,4-dinitro-6-n-hexyl phenol as an orange crystalline product, melting at 151°-152° C. and soluble to the extent of 0.0042 gram per 100 grams of water at 25° C.

The dicyclohexyl-amine salt of 2,4-dinitro-6-phenyl phenol as an orange crystalline material, melting at 167°-168° C. and having a solubility at 25° C. of 0.0152 gram per 100 grams of water.

The dicyclohexyl-amine salt of 2,4-dinitro-alpha naphthol as a yellow crystalline product, melting at 204°-205° C. and soluble in water to the extent of 0.0102 gram per 100 grams at 25° C.

The dicyclohexyl-amine salt of 2,4-dinitro-6-chloro-phenol as an orange crystalline material, melting at 135°-136° C. and soluble to the extent of 0.134 gram per 100 grams of water at 25° C.

The dicyclohexyl-amine salt of 2,4-dinitro-6-methyl phenol as a yellow crystalline compound, melting at 166°-167° C. and soluble to the extent of 0.164 gram per 100 grams of water at 25° C.

The dicyclohexyl-amine salt of 2,4-dinitro-phenol as a yellow crystalline material, melting at 163°-164° C. and having a solubility at 25° C. of 0.20 gram per 100 grams of water.

The compounds set forth above, and particularly those other than the derivatives of 2,4-dinitro-phenol, 2,4-dinitro-chloro-phenol, and 2,4-dinitro-6-methyl phenol, were found particularly suited for inclusion in summer spray materials. By reason of their low solubilities, these compounds exhibited a longer residual toxicity against insect pests and caused less injury to foliage than did more soluble and more volatile dinitro-phenolic materials. The derivatives of dinitro-phenol, 2,4-dinitro-6-methyl phenol, and 2,4-dinitro-6-chloro-phenol had high insecticidal toxicities, but were better adapted for use as insecticides and fungicides in applications where water solubility was not of particular importance, e. g. as in the tanning of leather, preparation of dormant sprays, and the like.

By substituting other cyclohexyl-amine compounds for those set forth in the examples, salts of mono- and di-(3-bromo-cyclohexyl)-amines, mono- and di-(3,5-dimethyl-cyclohexyl)-amines, mono- and di-(3-methyl-cyclohexyl)-amines, mono- and di-(4-methyl-cyclohexyl)-amines, mono- and di-(3-phenyl-cyclohexyl)-amines, mono- and di-(2-benzyl-cyclohexyl)-amines, mono- and di-(2-ethyl-cyclohexyl)-amines, mono- and di-(2,6-dimethyl-cyclohexyl)-amines, mono- and di-(4-phenyl-cyclohexyl)-amines, and the like, may be obtained. Similarly, by reacting such amines with other 2,4-dinitro-phenols, the corresponding salts of 2,4-dinitro-5-anilino-phenol, 2,4-dinitro-5-naphthylamino-phenol, 2,4-dinitro-5-cyclohexyl phenol, 2,4-dinitro-6-cyclopentyl phenol, 2,4-dinitro-6-tertiary-octyl phenol, 2,4-dinitro-carvacrol, and 2,4-dinitro-6-bromo-phenol are formed.

Other modes of applying the principle of our invention may be employed instead of those explained, change being made as regards the materials employed, provided the products set forth in the following claims be thereby obtained.

We therefore particularly point out and distinctly claim as our invention:

1. A cyclohexyl-amine salt having the formula $(C_6H_{11-m}R_m-)_nNH_{4-n}-O-X$ wherein $m$ and $n$ are integers not greater than 2, R represents a member of the group consisting of hydrogen, halogen, aryl, aralkyl, and those alkyl radicals containing from 1 to 8 carbon atoms, inclusive, and $-O-X$ represents an aromatic-oxy radical of the benzene and naphthalene series, characterized by having the oxygen directly attached to the nucleus and by nitro groups attached in the para position and in one of the positions ortho to the carbon-oxygen linkage.

2. A cyclohexyl-amine salt having the formula

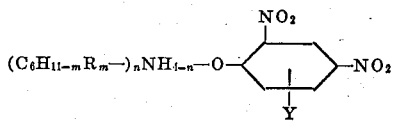

wherein $m$ and $n$ are integers not greater than 2,

R represents a member of the group consisting of hydrogen, halogen, aryl, aralkyl, and those alkyl radicals containing from 1 to 8 carbon atoms, inclusive, and Y represents a member of the group consisting of aryl, cycloalkyl, and lower alkyl radicals containing at least 2 carbon atoms.

3. A cyclohexyl-amine salt having the formula

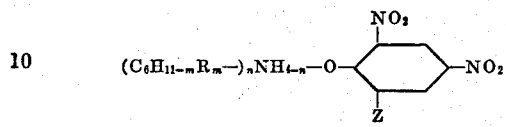

wherein $m$ and $n$ are integers not greater than 2, R represents a member of the group consisting of hydrogen, halogen, aryl, aralkyl, and those alkyl radicals containing from 1 to 8 carbon atoms, inclusive, and Z represents a saturated hydrocarbon radical containing 6 carbon atoms.

4. A cyclohexyl-amine salt having the formula

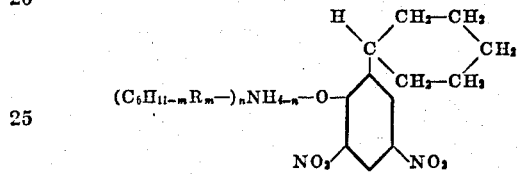

wherein $m$ and $n$ are integers not greater than 2, R represents a member of the group consisting of hydrogen, halogen, aryl, aralkyl, and those alkyl radicals containing from 1 to 8 carbon atoms, inclusive.

5. A cyclohexyl-amine salt having the formula

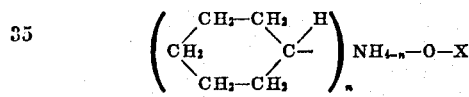

wherein $n$ is an integer not greater than 2, and —O—X represents an aromatic-oxy radical of the benzene and naphthalene series, characterized by having the oxygen directly attached to the nucleus and by nitro groups attached in the para position and in one of the positions ortho to the carbon-oxygen linkage.

6. A cyclohexyl-amine salt having the formula

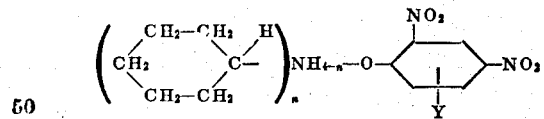

wherein $n$ is an integer not greater than 2, and Y represents a member of the group consisting of the aryl, cycloalkyl, and lower alkyl radicals containing at least 2 carbon atoms.

7. A cyclohexyl-amine salt having the formula

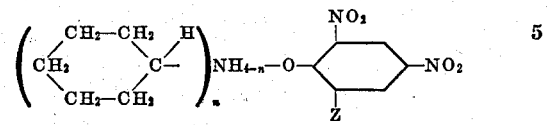

wherein $n$ is an integer not greater than 2, and Z represents a saturated hydrocarbon radical containing 6 carbon atoms.

8. A cyclohexyl-amine salt having the formula

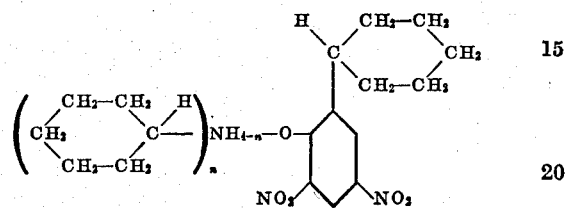

wherein $n$ is an integer not greater than 2.

9. A dicyclohexyl-amine salt having the formula

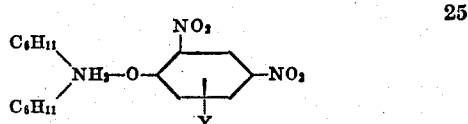

wherein Y represents a member of the group consisting of aryl, cycloalkyl, and lower alkyl radicals containing at least 2 carbon atoms.

10. A monocyclohexyl-amine salt having the formula

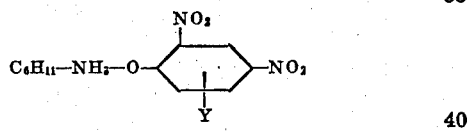

wherein Y represents a member of the group consisting of aryl, cycloalkyl, and lower alkyl radicals containing at least 2 carbon atoms.

11. The dicyclohexyl-amine salt of 2,4-dinitro-6-cyclohexyl phenol.

12. The monocyclohexyl-amine salt of 2,4-dinitro-6-cyclohexyl phenol.

13. The di-(2-methyl-cyclohexyl)-amine salt of 2,4-dinitro-6-cyclohexyl phenol.

EDGAR C. BRITTON.
FRANK B. SMITH.